(12) United States Patent
Oka et al.

(10) Patent No.: US 6,172,473 B1
(45) Date of Patent: Jan. 9, 2001

(54) DEVICE FOR DETERMINING ROTATIONAL NUMBER OF DC MOTORS

(75) Inventors: Toshimitsu Oka; Koji Aoki; Hideyuki Kanie; Hitoshi Ishikawa, all of Aichi-ken (JP)

(73) Assignee: Aisin Seiki Kabushiki Kaisha, Kariya (JP)

( * ) Notice: Under 35 U.S.C. 154(b), the term of this patent shall be extended for 0 days.

(21) Appl. No.: 09/408,835

(22) Filed: Sep. 30, 1999

(30) Foreign Application Priority Data

Sep. 30, 1998 (JP) .................................................. 10-278394

(51) Int. Cl.$^7$ ...................................................... H02P 5/28
(52) U.S. Cl. ..................... 318/244; 318/470; 318/245; 318/466; 388/911; 324/160; 324/177
(58) Field of Search ..................... 318/470, 466, 318/244, 245; 324/160, 177; 388/911

(56) References Cited

U.S. PATENT DOCUMENTS

| | | | |
|---|---|---|---|
| 4,514,670 | * | 4/1985 | Fassel et al. .......................... 318/467 |
| 5,017,846 | * | 5/1991 | Young et al. .......................... 318/244 |
| 5,483,132 | * | 1/1996 | Agata et al. ........................... 318/282 |
| 5,497,326 | | 3/1996 | Berland et al. .................. 364/424.05 |
| 5,646,497 | * | 7/1997 | Stickel .................................. 318/799 |
| 5,787,134 | * | 7/1998 | Kovacs .................................. 375/376 |

* cited by examiner

Primary Examiner—Paul Ip
Assistant Examiner—Rita Leykin
(74) Attorney, Agent, or Firm—Sughrue, Mion, Zinn, Macpeak & Seas, PLLC

(57) ABSTRACT

A device for determining a rotational number of an electric dc motor which drives a moving body of an automobile accessory such a sunroof, or a glass pane of a power window includes a switched capacitance filter for eliminating noise from the motor, a cutoff frequency of the switched capacitance filter being dependent on a clock input thereof; a pulse shaping circuit for generating a ripple pulse signal indicative of the rotational number of the motor by wave-shaping an output of the switched capacitance filter; and a pulse generating circuit providing an output pulse signal so as to establish a condition wherein the frequency of the ripple pulse signal is equalized to the cutoff frequency of the a switched capacitance filter.

5 Claims, 7 Drawing Sheets

(a)

switched capacitance ciruit (b)

$$fc = \frac{1}{2\pi RC_1}$$

cut-off frequency $$fc = \frac{1}{2\pi \cdot \frac{1}{fc_2} \cdot C_3} = \frac{fC_2}{2\pi C_3}$$

DEVICE FOR DETERMINING ROTATIONAL NUMBER OF DC MOTORS

BACKGROUND OF THE INVENTION

1. Field of the Invention

The present invention is directed to a device for determining the rotational number of a dc motor which is used particularly for driving a moving body of an automobile accessory such as a sunroof, a pane of glass in a power window, or an electrically operated seat device.

2. Description of Related Art

A conventional device of the kind is disclosed in the U.S. Pat. No. 5,497,326 granted to Berland et al. In this patent, the device issues a signal indicative of the amount of motor rotation. The signal is in the form of a pulse signal, which is generated in such a manner that a ripple component of a current flowing through the motor is formed into a pulse mode by being passed through a circuit including a low-pass filter and other components.

The frequency range of the ripple component of the current which the low-pass filter can treat is limited, which necessitates the provision of a compensating means to make the signal correct even though the range of the frequency range of the ripple component falls outside the ability of the low-pass filter.

However, providing such a compensating means is very cumbersome.

SUMMARY OF THE INVENTION

It is therefore, a principal object of the present invention to provide a device without the foregoing drawback.

In order to attain the foregoing object, the present invention provides a device for determining the rotational number of an electric dc motor comprising;

- a switched capacitance filter for eliminating noise from the motor, a cutoff frequency of the switched capacitance filter being dependent on a clock input thereof;
- a pulse shaping circuit for generating a ripple pulse signal indicative of the rotational number of the motor by wave-shaping an output of the switched capacitance filter; and
- a pulse generating circuit providing an out put pulse signal so as to establish a condition wherein the frequency of the ripple pulse signal is equalized to the cutoff frequency of the switched capacitance filter.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PRESENT INVENTION

Preferred embodiments of the present invention will be described hereinafter in detail with reference to the accompanying drawings.

Figure 1:
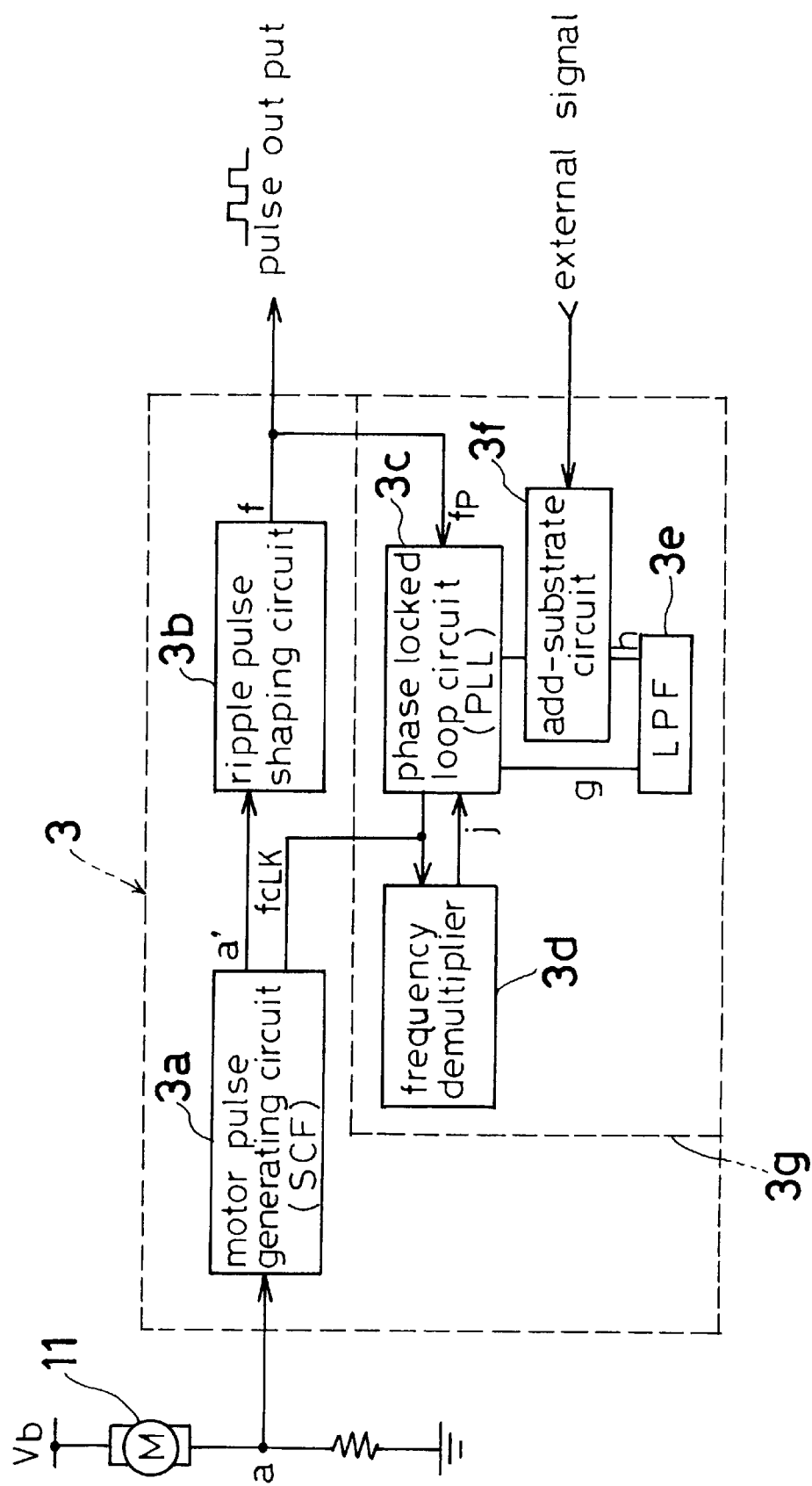
FIG. 1 is a block diagram of a motor pulse generating circuit of a device for determining a rotational number of a dc motor in accordance with an embodiment of the present invention.

First of all, with reference to FIG. 1, there is illustrated a motor pulse generating circuit 3 which generates a ripple pulse signal whose number of pulses per unit time duration varies with the rotational number of a DC motor 11. The motor pulse generating circuit 3 includes a switched capacitance filter (hereinafter called simply SCF) 3a, a ripple pulse shaping circuit 3b, and a pulse generating circuit 3g. The pulse generating circuit 3g has a phase locked loop circuit (hereinafter called simply PLL) 3c, a frequency demultiplier 3d, a low pass filter (hereinafter simply LPF) 3e, and an add-substrate circuit 3f.

Figure 2:
FIGS. 2(a) and 2(b) show the operation of a switched capacitance filter of the motor pulse generating circuit shown in FIG. 1.
Figure 2:
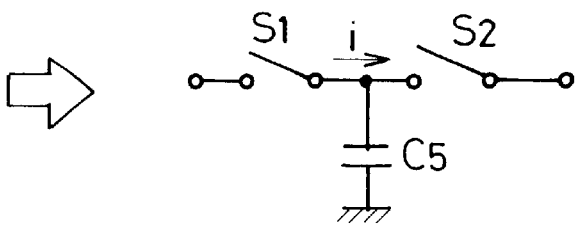
Figure 2:
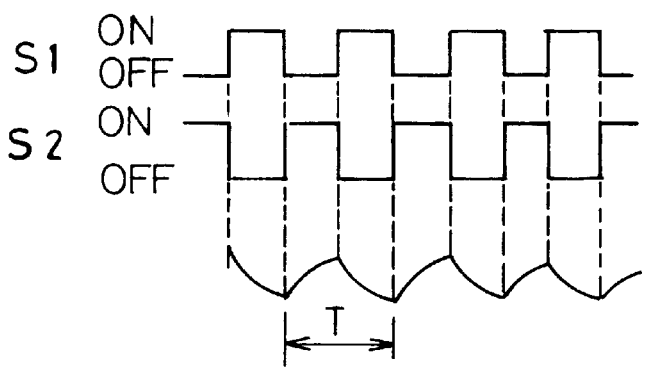
Figure 2:
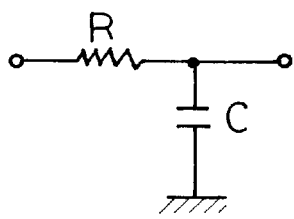
Figure 2:
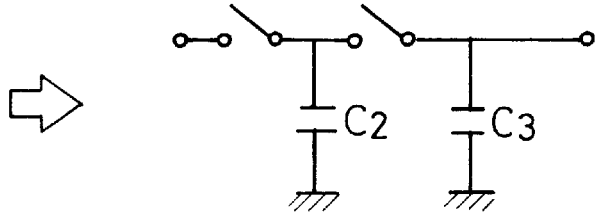

As can be understood easily from FIG. 2, the switched capacitance filter 3a is an application version of a well-known switched capacitance circuit which is constituted by a pair of analogue switches S1 and S2 and a capacitor C5. If the switches S1 and S2 are turned on and off alternately at a cycle of T, an electric current I flows which is expressed in a formula $$i = V/(1/fC).$$

Thus, the switched capacitance can be regarded as an equivalent resistor R. The cut-off frequency fc of a circuit which employees such a switched capacitance becomes variable which depends on a frequency for turning on and off the switches alternately. In the case of a switched capacitance filter, instead of frequency, a clock input is available. Such a cut-off frequency fc can be expressed as the formula indicated in FIG. 2. As the switched capacitance filter, a commercially available IC supplied from National Semiconductor under the item symbol of MF6-50. This has a noise reduction function and provides a cutoff frequency fc=fCLK IN where fCLK and N are a clock input frequency and a constant for example 50, respectively.

Figure 3:
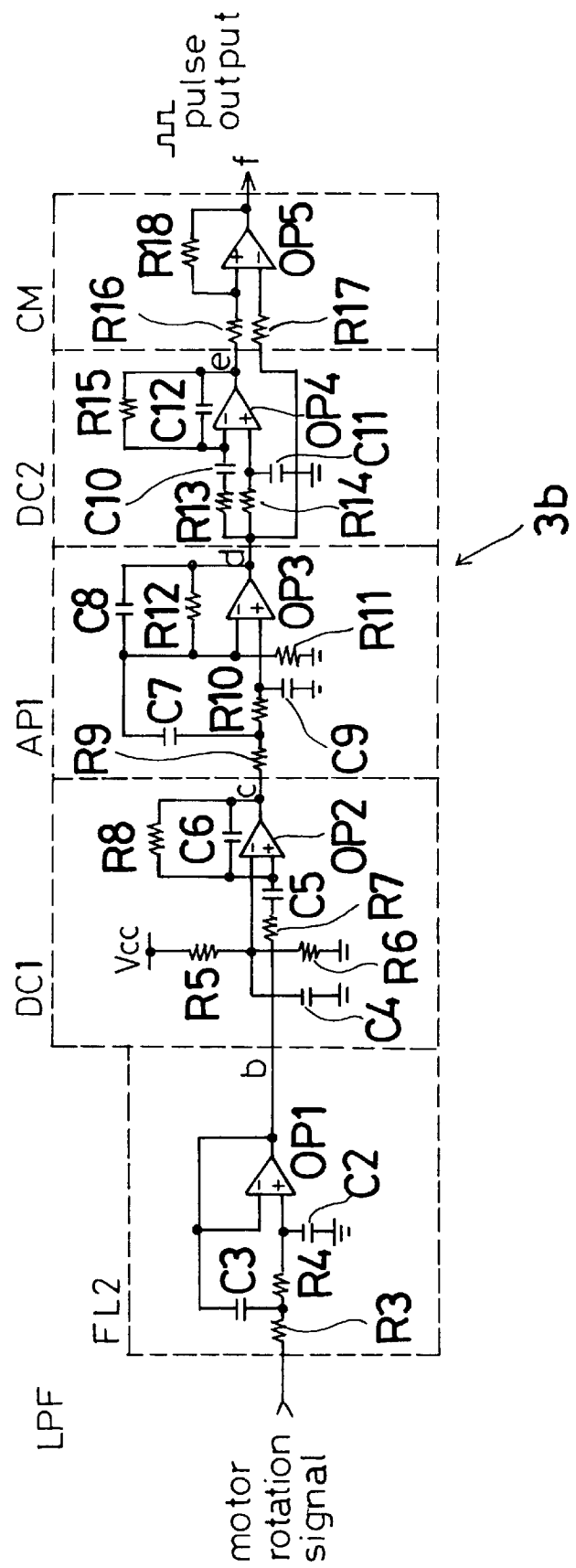
FIG. 3 is a detailed content of the motor pulse generating circuit shown in FIG. 1.

The ripple pulse shaping circuit 3b, as can be seen from FIG. 3, includes a high frequency active filter FL2, a first differentiating circuit DC1, a second differentiating circuit DC2, an amplifier API, and a comparator CM.

In the high frequency active filter FL2, a series of resistors R3 and R4 are coupled to a non-inverting terminal of an operational amplifier OP1 which is also grounded to the earth by way of a capacitor C2. An inverting terminal of the operational amplifier OP1 is connected via a capacitor C3 to a point at which the resistors meet for feedback. The filter FL2 serves for eliminating a high frequency component of a motor rotational signal. For example, a noise component above the maximum rotational speed (for example 6000 rpm) can be eliminated by increasing its damping factor, which results in the filter FL2 acting as a low pass filter which deletes noise superposed on the motor rotational signal or ripple frequency.

The first differentiating circuit DC1 is connected to an output terminal of the low pass filter LPF and differentiates a signal outputted therefrom for damping or decaying the dc component thereof. A series connection of a resistor R7 and a coupling capacitor C5 is connected to a non-inverting terminal of an operational amplifier OP2. A voltage divided by a series of resistors R5 and R6 is applied to an inverting terminal of the operational amplifier OP2 and a point at which the resistors R5 and R6 connect with each other and a bypass capacitor C4. A parallel connection of a resistor R8 and a capacitor C6 is connected between the non-inverting input terminal and an output terminal of the operational amplifier OP2.

An amplifier AP1, which serves for amplifying an output signal of the first differentiating circuit DC1, includes an operational amplifier OP3 whose non-inverting input terminal is connected to the output terminal of the operational amplifier OP2 via a series of resistors R9 and R10. The non-inverting input terminal of the operational amplifier OP3 is also grounded by way of a capacitor C9. A capacitor C7 is interposed between an inverting terminal of the operational amplifier OP3 and a point at which the resistors R9 and R10 connect. The inverting terminal of the operational amplifier OP3 is grounded by way of a resistor R11. A capacitor C8 and a resistor R12 which are arranged in parallel are connected between the inverting input terminal and an output terminal of the operational amplifier OP3.

The second differentiating circuit DC2 is connected to the output terminal of the operational amplifier OP3 of the amplifier AP1 low pass filter LPF and differentiates a signal outputted therefrom for establishing a phase shift of 90 degrees. The second differentiating circuit DC2 includes an operational amplifier OP4 whose non-inverting input terminal is connected to the output terminal of the operational amplifier OP3 of the Amplifier AP1 via a resistor R14. The non-inverting input terminal of the operational amplifier OP4 is grounded by way of a capacitor C11. Between the output terminal of the operational amplifier OP3 and an inverting input terminal of the operational amplifier OP4, there are interposed a resistor R13 and a capacitor C10 which are arranged in series. A resistor R15 and a capacitor C12 which are arranged in parallel are connected between the inverting input terminal and an output terminal of the operational amplifier OP4.

Figure 6:
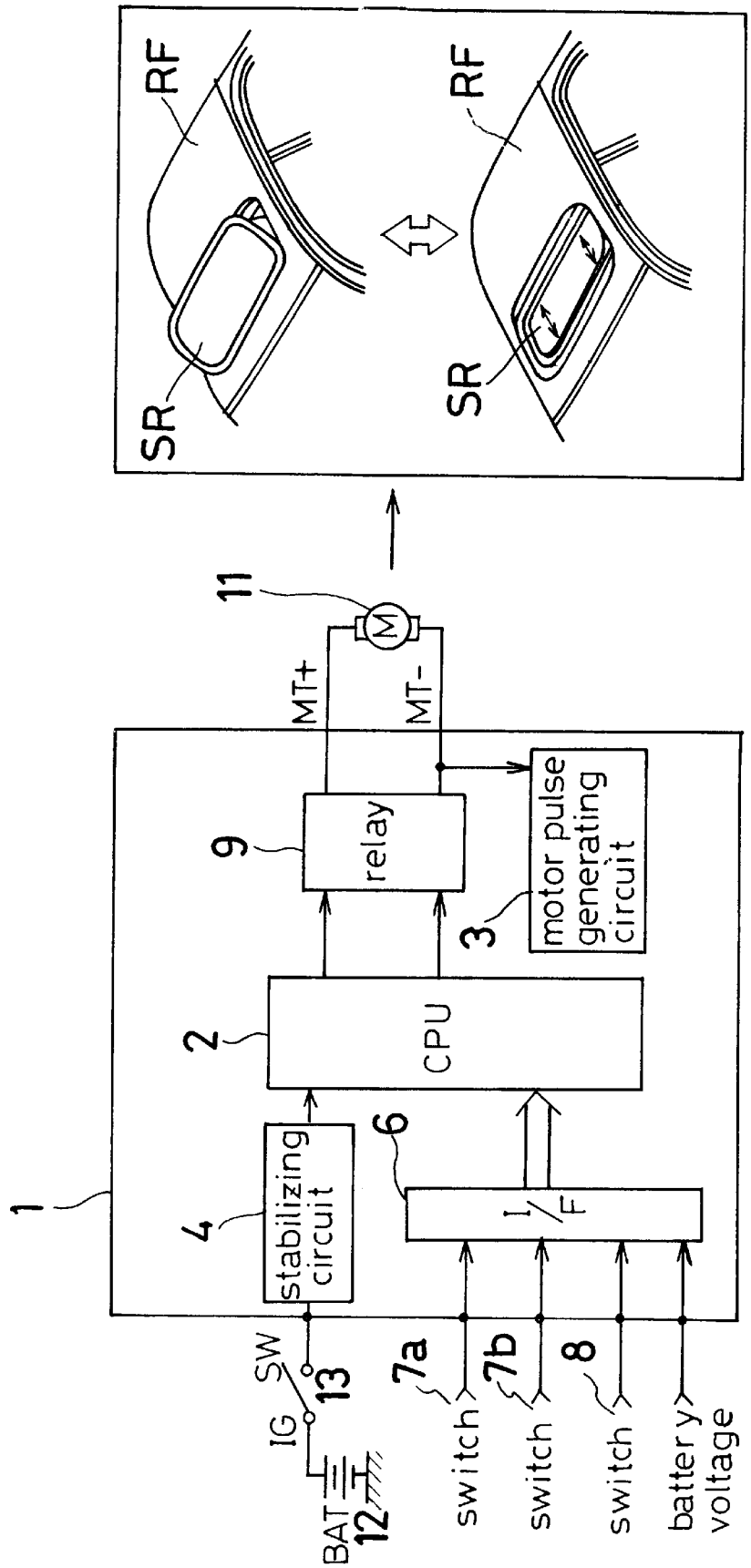
FIG. 6 is a schematic view of an obstruction detecting device accommodating therein the motor pulse generating circuit shown in FIG. 1.

The comparator CM, which compares output signals from the respective output terminal of the second differentiating circuit DC2 and output terminal, of the amplifier circuit AP1, includes an operational amplifier OP5 whose inverting input terminal is connected via a resistor R17 to the output terminal of the operational amplifier OP3 of the amplifier circuit AP1. A non-inverting input terminal of the operational amplifier OP5 is connected via a resistor R16 to the output terminal of the operational amplifier OP4 of the second differentiating circuit DC2. A resistor R18 is connected between the non-inverting input terminal and the output terminal of the operational amplifier OP5. From the output terminal of the operational amplifier OP5, a rectangular pulse signal or a ripple pulse signal is set to be outputted which corresponds to the ripple frequency and such a rectangular pulse signal is fed to a central processor or micro-processor 2 of a control device 1 (FIG. 6).

Figure 4:
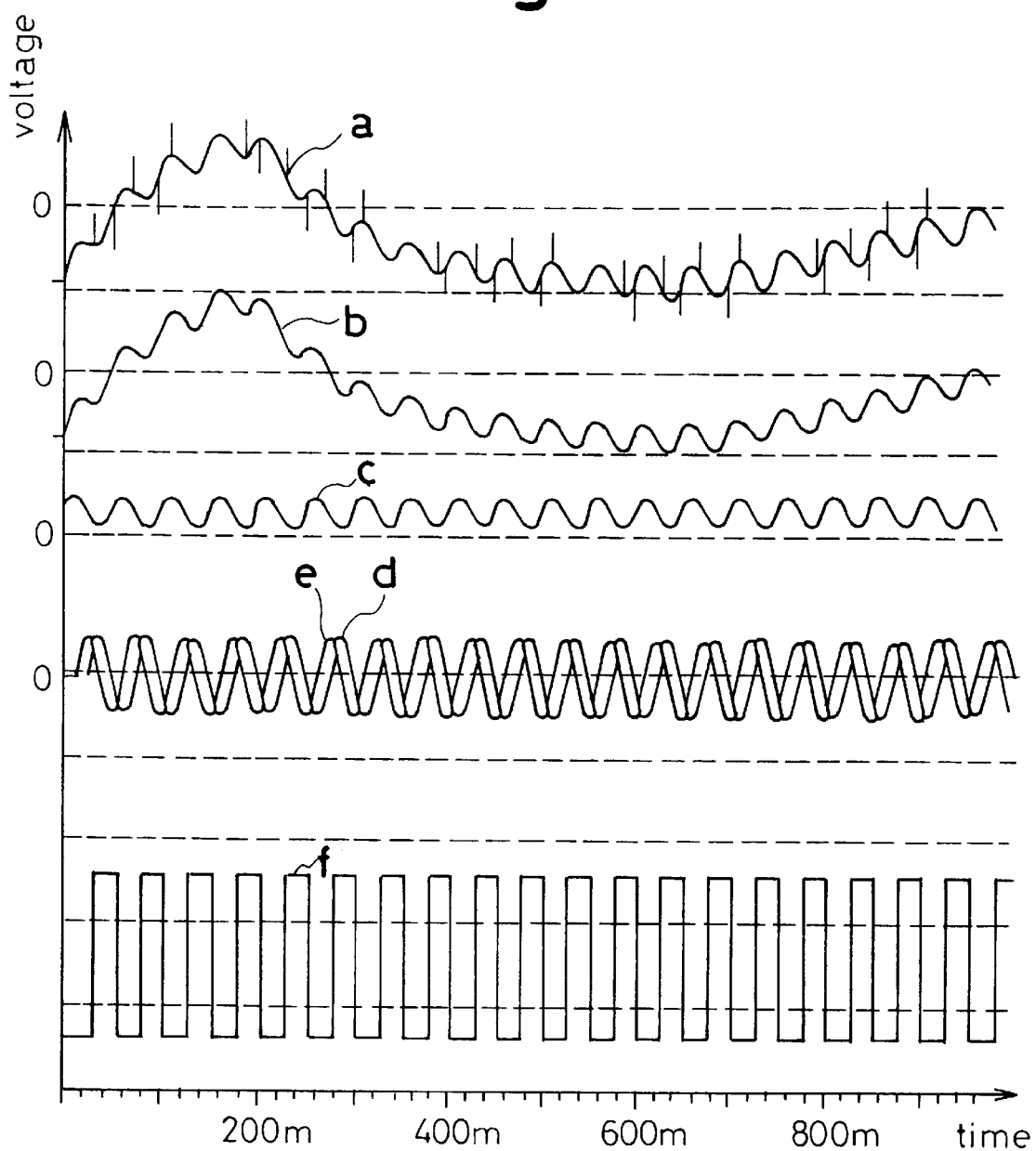
FIG. 4 shows graphs each of which are indicative of a waveform at various points in the motor pulse generating circuit shown in FIG. 1.

The current flowing through the motor 11 can be appreciated as a voltage signal or motor rotational signal which proportional thereto in magnitude. This voltage signal is superposed with ripple together with noise and has a wave-shape (a) indicated in FIG. 4. The ripple is inevitable, as is well known, when a dc motor is employed. During passage through the switched capacitance filter 3a, the noise is deleted or eliminated from the voltage signal and on the resultant voltage signal another noise is superposed due to the clock input of the switched capacitance filter 3a. However, passing such a voltage signal through the low pass filter LPF makes the voltage signal smooth without the noise and with a wave-shape (b). If such a voltage signal having the wave-shape (b) is passed through the first differentiating circuit DC1, the voltage signal is differentiated to damp or decay its dc component and the resultant voltage signal has a wave-shape (c). Furthermore, upon passing the voltage signal through the amplifier AP1, the resultant or amplified voltage signal attains a wave-shape (d). Thereafter, upon passing through the second differentiating circuit DC2, the voltage signal attains a wave-shape (e), which is delayed in phase by 90 degrees with respect to the wave-shape (d). Then comparing the voltage signal having the wave-shape (d) which is outputted from the amplifier AP1 and the voltage signal having the wave-shape (e) which is outputted from the second differentiating circuit DC2, the comparator CM issues a pulse signal having a wave-shape (f).

In the foregoing circuit, feedback control of the pulse signal having the wave-shape (f) is established so as to make the frequency of the ripple pulse the cut-off frequency fc of the switched capacitance filter 3a. In detail, whenever the pulse signal having the wave-shape (f) is input or fed to the PLL 3c, the PLL 3c outputs a frequency of 50 fp which is derived from the formula $fc = FCLk/N$ where N=50. The output of the PLL 3c having a frequency of 50 fp divided by 50 at the frequency demultiplier 3d and the frequency demultiplier 3d fed the resultant frequency of fp to the PLL 3c. In brief, a phase control of the output signal of the frequency demultiplier 3d is made to oscillate at a frequency which is in coincidence with the frequency fp of ripple pulse inputted to the PLL 3c. Thus, the cut-off frequency fc of the switched capacitance filter 3a will have a linear relationship relative to the pulse output or ripple pulse.

In addition, for ensuring the stable output of the PLL 3c at an initial stage of the pulse generating circuit 3g, the PLL 3c is added with the LPF 3e and the add-subtract circuit 3f. The oscillation of the PLL 3c at an initial stage can be kept at a voltage level by applying a battery voltage Vb for driving the motor 11 to the add-subtract circuit 3f as an outside signal thereof. Immediately when the oscillation of the PLL 3c reaches its steady stage, the PLL 3c begins to oscillate based on the ripple pulse signal inputted to the PLL 3c.

Figure 5:
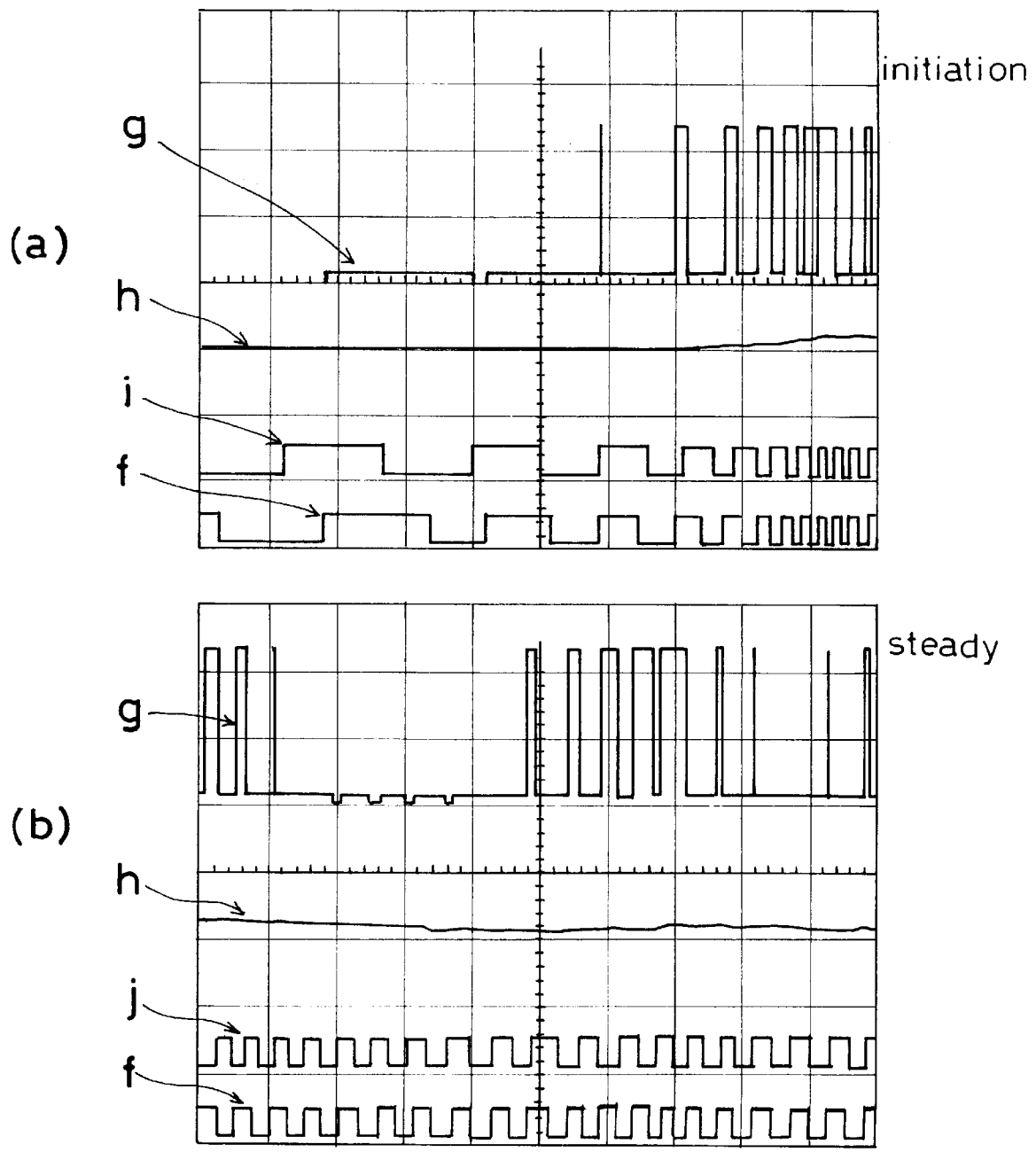
FIGS. 5(a) and 5(b) show timing-charts of the motor pulse generating circuit shown in FIG. 1 in its initiation and steady states, respectively.

In FIG. 5, if output signal wave-shapes of the frequency demultiplier 3d, the PLL 3c, and LPF 3e are assumed to be (i), (g), and (h), respectively, those wave-shapes are depicted in more detail in FIG. 5.

Referring to FIG. 6, there is illustrated an obstruction detection device which operates in such a manner that during a closing movement of a sunroof SR if a portion of human body of a passenger is held between the sunroof SR and an opening formed in a roof RF of a vehicle body the sunroof SR is stopped. This device includes the control unit 1. The control unit 1 has a stabilizing circuit 4 whose input side is connected via an ignition switch 13 to a plus terminal of a battery 12 whose negative terminal is grounded. Turning the ignition switch 13 on brings electric power to the control unit 1. The resultant electric power is inputted to the stabilizing circuit 4 as stabilized voltage. The resultant voltage is fed to the CPU 2 as a controller.

The sunroof SR is a movable member able to tilt and slide relative to the roof RF and such movements are established by a link mechanism (not shown) to which a rotational torque is transmitted from a sunroof motor 11 which is in the form of a dc motor. The detailed structure of the link mechanism is so well known that no further explanation thereof is necessary.

The motor 11 is connected between terminals MT+ and MT− of the control unit 1 which are connected to switching terminals of a relay 9, respectively, which is under the control of the CPU 2. By means of the relay 9, the CPU 2 switches the opposite polarities of the terminals MT+ and MT− with each other, thereby establishing a bi-directional operation mode of the motor 11. Thus, opening and closing movements (tilt-up and tilt-down movements) of the sunroof SR can be established by the sole motor 11. In addition, while the motor 11 is being driven, the current applied from the motor 11 is fed to the motor pulse generating circuit 3 after being dropped in voltage by a resistor (not shown). The output of the circuit 3 is fed to the CPU 2.

Figure 7:
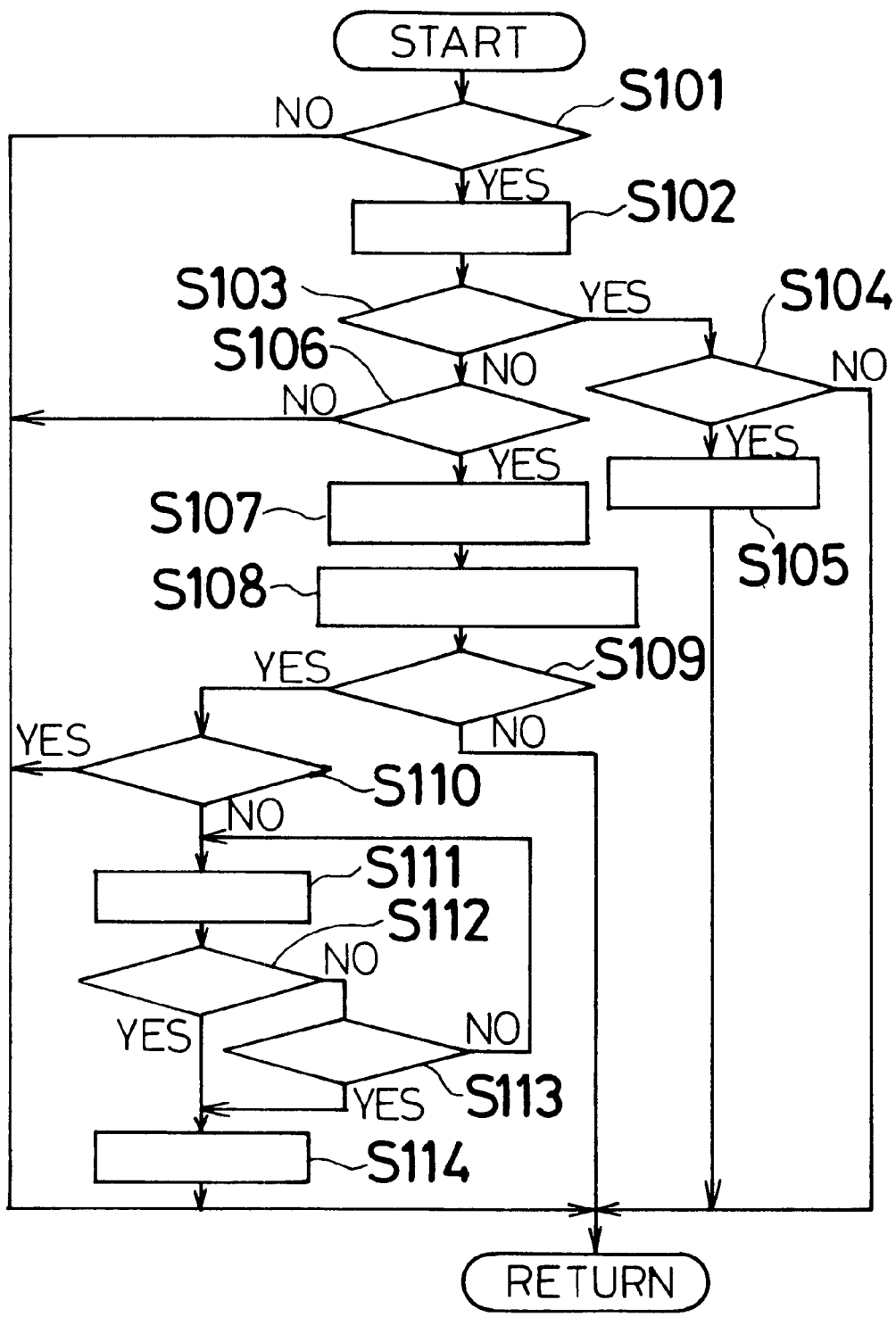
FIG. 7 is a flowchart providing a control of the device shown in FIG. 6.

With reference to FIG. 7, an operation of the obstruction detection device is explained. After insertion of a key (not shown) in a key cylinder (not shown), when the key is rotated through a fixed angle in the usual manner, the ignition switch 13 is turned on, thereby applying electric power to the control unit 1 from the battery 12. Then, a main program stored in the CPU 2 in the control unit 1 is executed every 2 milliseconds.

In the main program an initialization is made to check ROMs and RAMS, set memories or counters to zeros or other starting values, and check whether or not the system operates normally, thereafter, the sun roof operation control is made periodically.

At step S101, it is checked whether the closing switch 8 is closed or not. If the closing switch 8 is found to be open which indicates that a closing request for the sun roof SR has not been made, the successive steps are not executed. However, if the switch 8 is closed which indicates that the sunroof SR has been requested to close the opening in the roof RF, step S102 is executed to issue a signal from the CPU 2 which orders the relay 9 to close the opening, thereby driving the motor 11 for a closing operation of the sunroof SR.

At the next step S103, a check is made whether or not the sunroof position detection switch 7a is closed. If the result is yes, which indicates that the current position of the sunroof SR is not greater than 4 mm away from the fully closed position, at step S104, it is checked whether or not the sunroof is in the fully closed position by counting the number of a motor rotation pulses after the closure of the sunroof position detection switch 7a. If no, the current condition remains as it is. If the sunroof RF is found to be in its fully closed position, the sunroof operation is terminated at step S105.

If, at step S103, the sunroof position detection switch 7a is found not to be close, step S106 is executed to check whether or not the ripple pulse having he wave-shape (f) has come from the circuit 3. This procedure is established by checking whether or not a flag is set. The flag is to be set whenever a first pulse edge (either pulse rising edge or pulse falling edge) is detected by an interruption procedure. Immediately upon the setting of the flag, step S107 is executed to read the motor current from the circuit 3 and store the resultant motor current in the memory. The, step 108 is executed to calculate a current difference by subtracting the current value from a past current value (a current value, say, 100 pulses back).

Next, step S109 is executed to compare the current difference calculated at step S108 with a threshold value. The threshold value varies with the motor driving voltage Vb and if the motor driving voltage VB becomes higher (lower) the rotational speed of the motor 11 gets higher (lower) and the high is set to be larger or smaller, which causes an increase (a decrease) of the threshold value. If the result of step 109 is no, it is regarded that no obstacle is found and therefore the control is returned. If yes, step S110 is executed to check whether or not a masking operation is made. The masking operation is set to be initiated immediately upon initiation of the unit 1 by turning the switch 13 on and terminated immediately when the inputted pulse reaches its operation for a fixed time duration prior to such a steady condition, a non-sensitivity zone is formed which ignores the inputted pulse.

If the result of step S110 is no, step S111 is executed to operate an opening operation of the sunroof SR.

At step S112 which is in succession to Step 111, it is checked whether or not the position detection switch 7b is closed. This switch 7b is so designed as to be closed when the sunroof SR during opening movement takes a position 20 mm away from the fully closed position of the sunroof SR. If the result of step S112 is no which indicates that the switch 7b is open or the sun roof SR is in the opening movement within a range which terminates in the position 20 mm away from the fully closed position of the sunroof SR, step S113 is executed to check whether or not the motor 11 in its locked condition. If not, the control is returned to step S111.

If the result of step S112 is yes which indicates that the motor 11 is in the locked condition though the sunroof SR is in opening movement, step S114 is executed to terminate or stop the sunroof control, that is to say, when an obstacle is found to be held between an inner periphery of the roof opening and the sunroof SR during closing movement, the control unit 1 reverses the rotation of the motor 11 which causes the opening movement of the sun roof SR. If the sunroof SR in opening movement reaches the position 20 mm away from the fully closed position of the sunroof SR the motor 11 is stopped, thereby terminating the opening movement of the sun roof SR.

The invention has thus been shown and description with reference to specific embodiments, however, it should be understood that the invention is in no way limited to the details of the illustrates structures but changes and modifications may be made without departing from the scope of the appended claims.

What is claimed is:

1. A device for determining rotational number of an electric dc motor comprising;
   a switched capacitance filter for eliminating noise from the motor, a cutoff frequency of the switched capacitance filter being dependent on a clock input thereof;
   a pulse shaping circuit for generating a ripple pulse signal indicative of the rotational number of the motor by wave-shaping an output of the switched capacitance filter; and
   a pulse generating circuit providing an output pulse signal so as to establish a condition wherein the frequency of the ripple pulse signal is equalized to the cutoff frequency of the a switched capacitance filter.

2. A device as set forth in claim 1, wherein the clock input of the switched capacitance filter is a feedback signal of the ripple pulse.

3. A device for determining rotational number of an electric dc motor for driving a moving body of an automobile accessory, the device comprising;
   a switched capacitance filter for eliminating noise from the motor, a cutoff frequency of the switched capacitance filter being dependent on a clock input thereof;
   a pulse shaping circuit for generating a ripple pulse signal indicative of the rotational number of the motor by wave-shaping an output of the switched capacitance filter; and
   a pulse generating circuit providing an output pulse signal so as to establish a condition wherein the frequency of the ripple pulse signal is equalized to the cutoff frequency of the a switched capacitance filter.

4. A device as set forth in claim 3, wherein the clock input of the switched capacitance filter is a feedback signal of the ripple pulse.

5. A device as set forth in claim 3, wherein the automotive accessory is a sunroof.

* * * * *